United States Patent

Wolf et al.

[11] 4,103,210
[45] Jul. 25, 1978

[54] DRAW TWISTING MACHINE

[75] Inventors: Horst Wolf, Albershausen; Rolf Seher, Denkendorf, both of Fed. Rep. of Germany

[73] Assignee: Zinser-Textilmaschinen GmbH, Ebersbach, Fed. Rep. of Germany

[21] Appl. No.: 624,389

[22] Filed: Oct. 21, 1975

Related U.S. Application Data

[63] Continuation of Ser. No. 409,010, Oct. 23, 1973, abandoned.

[30] Foreign Application Priority Data

Oct. 21, 1972 [DE] Fed. Rep. of Germany ....... 2251843

[51] Int. Cl.² ............................................. H07K 17/34
[52] U.S. Cl. .......................................... 318/46; 318/8
[58] Field of Search .................. 318/8, 152, 46, 148; 322/9, 12, 13, 16; 57/90, 91, 92, 93, 95, 97, 100

[56] References Cited

U.S. PATENT DOCUMENTS

| | | | |
|---|---|---|---|
| 2,376,421 | 5/1945 | Drake | 322/9 |
| 2,515,565 | 7/1950 | Mohl | 318/8 |
| 2,763,824 | 9/1956 | Bacheler | 57/95 |
| 3,210,629 | 10/1965 | Hornbarger et al. | 318/46 |
| 3,315,148 | 4/1967 | Grillo | 322/13 |
| 3,379,945 | 4/1968 | Mitchell et al. | 318/46 |
| 3,417,561 | 12/1968 | Wolf | 57/100 |
| 3,521,441 | 7/1970 | Lamprster | 57/90 |
| 3,636,696 | 1/1972 | Howe et al. | 57/90 |
| 3,668,485 | 6/1972 | Norris | 318/46 |

Primary Examiner—James R. Scott
Assistant Examiner—John J. Feldhaus
Attorney, Agent, or Firm—Edwin E. Greigg

[57] ABSTRACT

A draw twisting machine is provided with a plurality of synchronous motors which drive respective draw rollers. The synchronous motors are supplied with electrical power from an A.C. generator having a variable frequency output. The A.C. generator is driven by a D.C. motor which is operatively arranged to run at variable angular velocity (rpm), the velocity being steplessly variable over a wide range. The D.C. motor may be driven at a crawl speed by an asynchronous electric motor via a transmission and overriding clutch.

7 Claims, 1 Drawing Figure

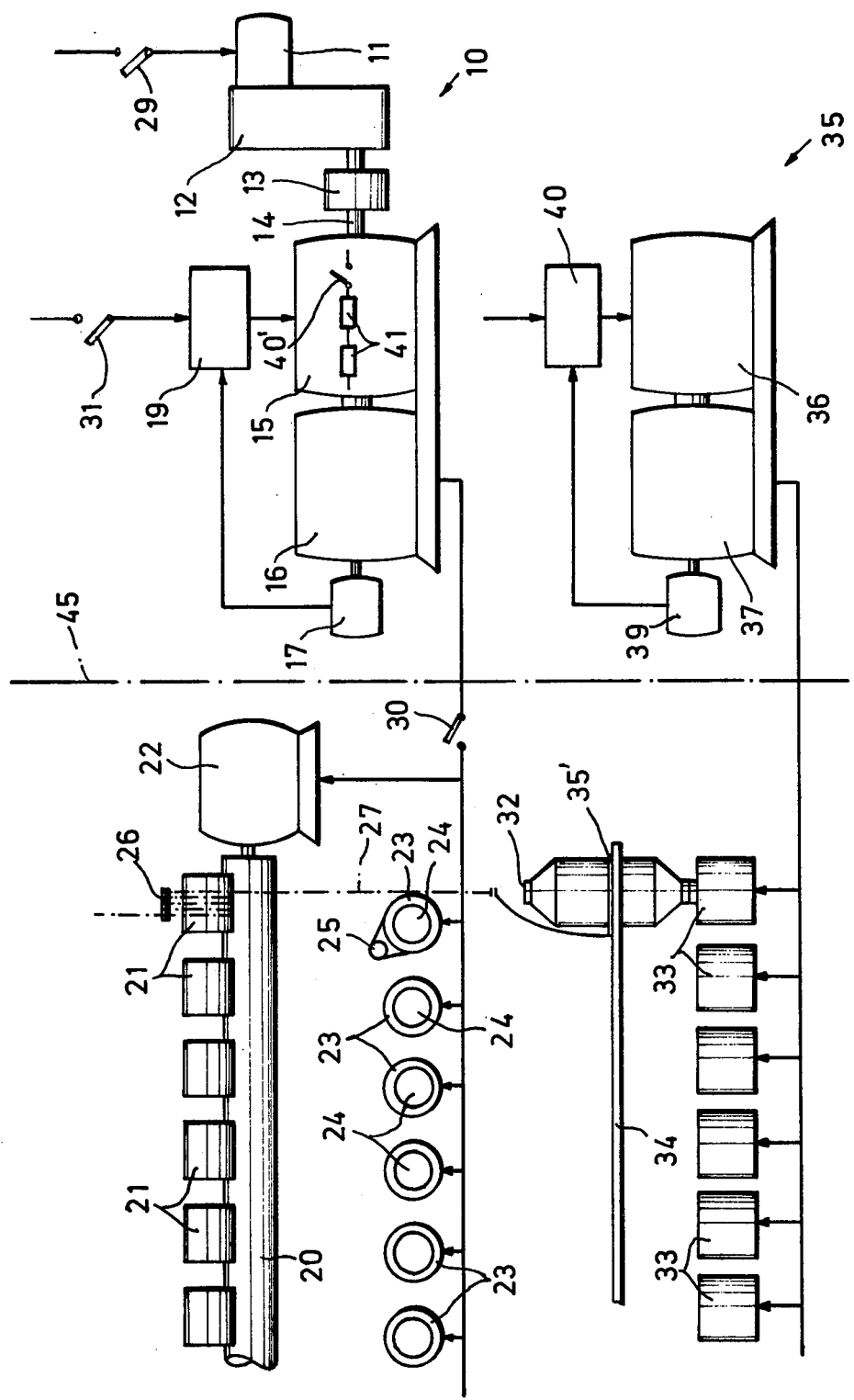

DRAW TWISTING MACHINE

This is a continuation, of application Ser. No. 409,010, filed Oct. 23, 1973, now abandoned.

BACKGROUND OF THE INVENTION

This invention relates to a draw twisting machine provided with a plurality of synchronous motors which drive fiber (thread, strand, yarn, filament or the like) draw rollers. The invention relates more particularly to a draw twisting machine which is provided with a plurality of synchronous motors arranged to drive respective draw rollers of the machine. The draw rollers should run at substantially identical angular velocities (rpm) and be able to be stopped at substantially the same angular position. The electrical supply for the synchronous motors is provided by a variable frequency A.C. generator driven by a D.C. motor, the output frequency of the A.C. generator being proportional to the angular velocity (rpm) of a shaft which couples the D.C. motor to the A.C. generator. The angular velocity of the D.C. motor may be varied in a stepless manner.

The high fiber transport velocities which occur in fast running draw twisting machines require that the draw rollers, which pull the fibers from stretch or shrinking zones, be driven by individual electric motors, because a common drive of the draw rollers by bevel gears or the like does not meet the requirements of the high angular velocity of the draw rollers. On the other hand, a single delivery roller effecting the delivery of the fibers into the stretching or shrinking zones of the draw twisting machine can be used to deliver fibers to all stretching or shrinking zones of one side of the machine, so that, normally, only two delivery rollers are necessary (one for each side of the machine). These two delivery rollers are also driven by synchronous motors. With respect to draw rollers and with respect to the delivery rollers there is a requirement, in practice, that, first of all, all the draw rollers should run as closely as possible in angular synchronism with respect to one another and a requirement that, furthermore, these rollers should do so with respect to the delivery rollers. If these requirements are not met, the stretching or shrinking zones would non-uniformly stretch or shrink the fibers running therethrough. The drive motors for the draw rollers and for the delivery rollers are, for this reason, synchronous motors which are supplied, in a known manner, from a common, variable frequency A.C. generator which can be disposed either on the machine or external to the machine and which is itself driven by a D.C. motor whose velocity (rpm) is variable and can be regulated.

In known drive assemblies of the above-mentioned type, the startup of the synchronous motors is effected by firstly driving the variable frequency A.C. generator by the D.C. motor at a crawl speed of, for example, 40 rpm which generates an output frequency from the A.C. generator of 1 Hz, for example, and subsequently, the synchronous motors are switched on simultaneously while the A.C. generator provides this crawl-speed frequency.

Because of the speed sensitive characteristics of D.C. motors at low speeds, a load impulse occurs during switch on, and the speed of the D.C. motor and, therefore, that of the variable frequency A.C. generator begins to oscillate. This leads undesirably to oscillation of the draw rollers and subsequently to the looping of fibers or to their falling off from the draw rollers or to their breakage. The speed regulation of the D.C. motor is too slow to prevent the unwanted oscillation and the undesirable consequences. If one were to attempt to prevent the undesirable oscillation by associating a large inertial mass with the D.C. motor or with the variable frequency A.C. generator, the acceleration and the deceleration (braking) of the variable frequency A.C. generator would be undesirably retarded.

SUMMARY OF THE INVENTION

It is an object of the present invention to provide an improved draw twisting machine which is free of oscillations when its drive assembly is energized.

It is another object of the present invention to provide a draw twisting machine which includes a drive assembly having a plurality of synchronous motors and is virtually free of oscillations during energization.

It is a further object of the present invention to provide a draw twisting machine which can run for relatively long periods of time at crawl, relatively slow, speed (rpm).

It is an additional object of the present invention to provide a draw twisting machine which includes a drive assembly having a plurality of synchronous motors which can be supplied at frequencies which correspond to relatively slow, crawl speed (rpm) for relatively long periods of time.

The foregoing objects, as well as others which are to be made clear from the text below, are accomplished in accordance with the present invention in a draw twisting machine which includes an electrical drive assembly having a plurality of synchronous motors operatively arranged to drive respective draw rollers. A variable frequency A.C. generator supplies electrical power to the synchronous motors. The A.C. generator is driven by a D.C. motor which can be run at variable angular velocity (rpm) in a variable, stepless manner over a wide range. The D.C. motor may be driven at a crawl speed, which is relatively slow, with an asynchronous motor via a transmission and overriding clutch.

It is the salient feature of the present invention that it is provided with a D.C. motor which may be driven by an asynchronous A.C. motor through a transmission and an overriding clutch at least at one crawl speed (rpm).

The technique provided by the present invention makes it possible to drive the variable frequency A.C. generator at crawl speed by means of the asynchronous A.C. motor by having the asynchronous motor drive the D.C. motor at the desired crawl speed. Asynchronous motors are relatively speed-stable and, because of the transmission ratio effected by the transmission gearing, a relatively small asynchronous motor can provide good speed stability at crawl speeds, thereby preventing the feared undesirable oscillation of the draw rollers when the synchronous A.C. motors are switched into the circuit.

The D.C. motor can be turned on during the driving of the variable frequency A.C. generator by the asynchronous A.C. motor so that it aids the asynchronous A.C. motor in driving the A.C. generator. However, it can also be provided that the D.C. motor, while being driven by the asynchronous A.C. motor at crawl speed, is not turned on or at least it is sometimes not turned on.

The drive assembly has the further advantage that, in use, crawl speed can be maintained without problems for a fairly long period of time. For example, it is often necessary, when new fibers are being placed in the draw twisting machine, to drive the synchronous motors, for example, for possibly 20 minutes at a slow crawl speed. If the crawl speed is not effected according to the present invention, but is effected exclusively by the D.C. motor, then the D.C. motor would have to be considerably over-dimensioned, if it were required to let the machine run for fairly long time periods at the crawl speed. This is so because the wasted power and, therefore, the heating at low speed is considerably greater than during normal operation. What should be further considered is that the speed differences between the crawl speed and normal operation speed are quite large and, in general, lie in the order of magnitude of about 1:100.

It is suitable to provide that the speed of the D.C. motor over its entire speed range, from crawl speed to the highest operational speed, can be controlled or regulated as steplessly (continuously) as possible in order to be able to limit the acceleration and/or deceleration in such a manner that the synchronous A.C. motors never get out of step.

An asynchronous A.C. motor, in general, does not have to have the capabilities for varying its speed. If necessary, however, it can be switched to one of several speeds, for example, by designing it as a motor having a variable number of pairs of poles so that, if necessary, several crawl speeds for the variable frequency A.C. generator can be provided.

As soon as the speed of the D.C. motor becomes greater than the input speed to the transmission gearing, then the effect of the overriding clutch is that the D.C. motor drives the variable frequency A.C. generator by itself. In that case, the asynchronous A.C. motor can be switched off.

When the draw twisting machine is stopped, attention must be paid so that the synchronous A.C. motors, which are supplied by the variable frequency A.C. generator, and some of which have very different moments of inertia, can be stopped synchronously at substantially the same angle. The individual synchronous A.C. motors driving the draw rollers have a relatively small moment of inertia and the synchronous A.C. motor driving the single delivery roller has a relatively large moment of inertia. The drive assembly of the draw twisting machine can be suitably, and preferably stopped and, therefore, the synchronous A.C. motors as well, by switching the D.C. motor out of its supply circuit and by switching at least one resistor in parallel with it. In that case, the synchronous A.C. motors drive the variable frequency A.C. generator, which, in turn, drives the D.C. motor, which then functions as a generator. The energy produced by the D.C. motor acting as a generator is transformed into heat within the resistor, and the D.C. motor acts as a brake. In this manner, the electrical continuity between the synchronous A.C. motors, the D.C. motor and the variable frequency A.C. generator is maintained, and these members remain in synchronism. It has been shown that this braking process is reproducible, i.e. approximately the same braking periods are always realized during braking.

BRIEF DESCRIPTION OF THE DRAWING

The sole drawing FIGURE is a schematic diagram of an exemplary embodiment of a draw twisting machine according to the present invention.

DETAILED DESCRIPTION OF THE PREFERRED EMBODIMENT

A draw twisting machine according to the present invention includes a drive assembly 10 formed by an asynchronous A.C. motor 11 which drives a shaft 14 of a variable speed D.C. motor 15 through a transmission gearing 12 and an overriding clutch 13. Driving occurs so long as the speed (rpm) of the D.C. motor 15 does not exceed the input speed (rpm) to the overriding clutch 13. The shaft of the D.C. motor 15 is rotationally fixed to the shaft of a variable frequency A.C. generator 16, whose output frequency is directly proportional to its drive speed. The shaft of the variable frequency A.C. generator 16 drives a tachometer 17 which supplies an output control signal corresponding to the actual speed of the variable frequency A.C. generator, to a speed regulator 19 which regulates the speed of the D.C. motor 15. The regulator 19 may be an electronic regulator having thyristors and whose setting level is steplessly adjustable from crawl speed up to the highest operational speed of the D.C. motor 15. The regulator 19 regulates the speed of the D.C. motor 15 steplessly, that is, the speed of the D.C. motor 15 may be infinitely or continuously varied.

The drive assembly 10 can be disposed either apart from the draw twisting machine itself or, if desired, on the machine itself. Only a few machine elements (parts) of the draw twisting machine are schematically shown in the drawing, for purposes of clarity. It is to be understood that the details of the draw twisting machine which are not illustrated are conventional. The draw twisting machine includes a single delivery roller 20 which is driven by a synchronous motor 22. The delivery roller 20, in turn, contacts and drives a plurality of pressure rollers 21. At some distance below each fiber delivery location, formed by respective ones of the pressure rollers 21 and the circumferential surface of the delivery roller 20, which is in contact with the pressure rollers 21, there are disposed respective draw rollers 23. Each draw roller 23 is driven by its own individual synchronous motor 24. In a known manner, fiber guide or displacement rollers, such as rollers 25, 26 are operatively associated with the pressure rollers 21 and the draw rollers 23, only one roller 25, 26 being shown in the drawing in each case.

Between each of the pressure rollers 21 and the particular draw roller 23 lying below it, a working fiber drawing zone is formed which is traversed by a fiber 27. The fiber is treated in this zone in a manner known for draw twisting machines, for example, it is heated and stretched or shrunk.

The stretching or shrinking is accomplished, in a well known manner, by making the fiber delivery velocity determined by the delivery roller 20 smaller or larger than the circumferential velocity of the draw rollers 23. A large number of such working zones having the above described driven fiber transporting rollers 20, 23 are disposed at one or both sides of the draw twisting machine.

The variable frequency A.C. generator 16 simultaneously supplies power to all of the single synchronous A.C. motors 24 driving the draw rollers 23. The A.C. generator 16 also supplies the synchronous motor 22 which drives the delivery roller 20. All of the synchronous motors 22, 24 must start with the greatest angular synchronism possible, must not lose step during their running and must also decelerate, simultaneously in angular synchronism, to standstill.

During startup of the machine, the asynchronous motor 11 is switched on by closing a switch 29. The asynchronous motor 11 drives the variable frequency A.C. generator 16 through members 12, 13 and 15, at crawl speed. The D.C. motor 15 may be simultaneously switched on as well by closing a switch 31, but in that case the regulator 19 must first be adjusted so that its set speed is less than the speed provided by the asynchronous motor 11. In general however, it is more advantageous that, at first, only the asynchronous motor 11 is switched on and that the D.C. motor 15 is only added to the circuit by the closing of the switch 31, when the predetermined high operational speed is to be reached from the initial crawl speed.

As soon as the variable frequency A.C. generator 16 has achieved the predetermined crawl speed, all of the synchronous motors 22, 24 can simultaneously be placed in the circuit by the closing of a switch 30. The load impulse occurring thereby practically does not alter the speed of the variable frequency A.C. generator 16 because of the drive by means of the asynchronous motor 11. It is, of course, to be assumed that the asynchronous motor 11 is made sufficiently large. Normally, when the draw twisting machine is started up, all fibers are in place and after the closing of the switch 30, which turns on the synchronous motors 22, 24, the D.C. motor 15 may be made to drive the synchronous motors 22, 24 toward their high, operational speeds, at which point the nominal level of the speed regulator 19 is automatically adjusted or adjusted by hand so rapidly that the synchronous motors 22, 24 increase their speed up to the operational predetermined speed without losing synchronism.

If it is desired, after the synchronous motors 22, 24 have been switched into the circuit, to let the variable frequency A.C. generator 16 continue to run at crawl speed for some shorter or longer period of time in order to drive the synchronous motors at crawl speed, then it is suitable not to supply the D.C. motor 15 with current during that period of time or at least to supply it with a substantially reduced voltage in order to prevent thermal overloading. The asynchronous motor 11 cannot be thermally overloaded because during the crawl speed of the variable frequency A.C. generator 16, it runs at its normal operational speed which is changed by the transmission gearing 12 to a lower speed. Each draw roller 24 is, as is known, associated with a respective spindle, only one spindle 32 of the draw twisting machine being illustrated. The spindle 32 is driven by an individual drive motor 33. The fiber 27 is delivered onto the spindle 32 by the associated draw roller 23 and is wound by a ring 35' mounted on a ring rail 34, the ring 35' having an associated runner in a known conventional fashion. A similar spindle and ring are assigned to each of the other draw rollers 23, however, only the individual drive motors 33 which drive these other spindles, are illustrated. These spindle drive motors 33 are also synchronous motors, however, the conditions here are not critical in the way that has been described above as applying to the synchronous motors 22, 24. Consequently, it is sufficient to utilize a separate spindle drive assembly 35 for supplying power to the spindle drive motors 33. The drive assembly 35 includes a D.C. motor 36 and a variable frequency A.C. generator 37 driven thereby. The speed of the D.C. motor 36 is also regulated, in a manner known per se, by means of a tachometer 39 and a regulator 40, the tachometer 39 being driven by the A.C. generator 37.

The deceleration of the drive assembly 10 and of the synchronous motors 22, 24 is effected by opening the switch 31 and simultaneously closing a switch 40' which places resistors 41 in parallel with the windings of the D.C. motor 15, so that, from this point on, the D.C. motor 15 operates as a generator whose generated electrical energy is dissipated by the resistors 41.

The electrical drive assemblies 10 and 35 can be mounted on the draw twisting machine, as shown diagrammatically by the dash-dotted line 45, or they may be located at a distance from the machine.

It is to be appreciated that numerous variants in the illustrated and above-described embodiment of the invention, as well as other embodiments, are contemplated and are possible within the spirit and scope of the present invention, the scope of the invention being defined in the appended claims.

What is claimed is:

1. In a draw twisting machine having an electrical drive means for simultaneously supplying power to a plurality of synchronous motors which drive fiber transport rollers of the draw twisting machine and which are to start, run and stop in synchronism, the electrical drive means including a variable frequency A.C. generator whose output frequency is proportional to the shaft speed of a driven shaft and a D.C. motor, whose speed can be steplessly varied, coupled to the driven shaft, the improvement comprising: auxiliary drive means including an electric motor of a type whose operational speed of rotation is substantially unaffected by changes in load.

2. A machine as defined in claim 1, further comprising resistance means and switch means, said switch means being operatively arranged to disconnect selectively said D.C. motor from its power supply and to connect said resistance means in parallel with said D.C. motor so that it then functions as a brake for stopping said synchronous motors by production of electrical energy which is transformed in said resistance means into heat.

3. A machine as defined in claim 2, wherein said resistance means comprises at least one resistor.

4. A machine as defined in claim 2, wherein said resistance means comprises at least one resistor connected in series with a switch constituted by part of said switch means.

5. A machine as defined in claim 1, wherein said electric motor is an asynchronous motor.

6. A machine as defined in claim 1, the improvement further comprising a releasable clutch, disposed between said auxiliary drive means and said synchronous generator.

7. A machine as defined in claim 6, wherein said clutch is an overrunning clutch.

* * * * *